United States Patent [19]

Simpson

[11] Patent Number: 5,653,652
[45] Date of Patent: Aug. 5, 1997

[54] HYDRAULIC TENSIONING SYSTEM WITH DUAL ARM BLADE

[75] Inventor: Roger T. Simpson, Ithaca, N.Y.

[73] Assignee: Borg-Warner Automotive, Inc., Sterling Heights, Mich.

[21] Appl. No.: 574,257

[22] Filed: Dec. 18, 1995

[51] Int. Cl.⁶ ........................................................ F16H 7/08
[52] U.S. Cl. ........................................... 474/110; 474/111
[58] Field of Search ..................................... 474/110, 111, 474/133, 135, 138

[56] References Cited

U.S. PATENT DOCUMENTS

| | | | |
|---|---|---|---|
| 1,988,421 | 1/1935 | McCann et al. | 474/111 |
| 2,054,023 | 9/1936 | McCann et al. | 474/111 X |
| 2,129,107 | 9/1938 | Taylor | 474/111 X |
| 3,242,751 | 3/1966 | Whitham | 474/111 |
| 3,490,302 | 1/1970 | Turner et al. | |
| 3,830,114 | 8/1974 | Daines | 474/111 |
| 4,030,376 | 6/1977 | Baudoin et al. | 474/111 |
| 4,245,518 | 1/1981 | Toyokuni et al. | 474/111 |
| 4,921,472 | 5/1990 | Young | 474/111 |
| 5,055,088 | 10/1991 | Craduck et al. | 474/111 |
| 5,222,917 | 6/1993 | Shimaya et al. | 474/111 X |
| 5,248,282 | 9/1993 | Suzuki | 474/110 |
| 5,266,066 | 11/1993 | White | 474/111 |
| 5,318,482 | 6/1994 | Sato et al. | 474/111 |
| 5,346,436 | 9/1994 | Hunter et al. | 474/110 |
| 5,352,159 | 10/1994 | Suzuki et al. | 474/110 |
| 5,462,493 | 10/1995 | Simpson | 474/111 |

*Primary Examiner*—Roger J. Schoeppel
*Attorney, Agent, or Firm*—Hugh A. Abrams, Esq.; Greg Dziegielewski, Esq.

[57] ABSTRACT

A chain tensioner system having a dual arm blade and a hydraulic tensioner. A hydraulic tensioner applies force against the free ends of the dual arms. Each arm is supported in two places, i.e., at the pivot point and against the tensioner piston. A face material that has a high P/V rating is added to the surface of the arm. The arms are simple flat plastic shoes with a hole at one end for the pivot point. A blade spring can be inserted into one or both of the plastic shoes. The tensioner piston moves in and out, the arms in the dual arm tensioner system slide against one another. As one of the tensioner arms applies the force to the chain the other arm damps the movement of the first arm.

9 Claims, 5 Drawing Sheets

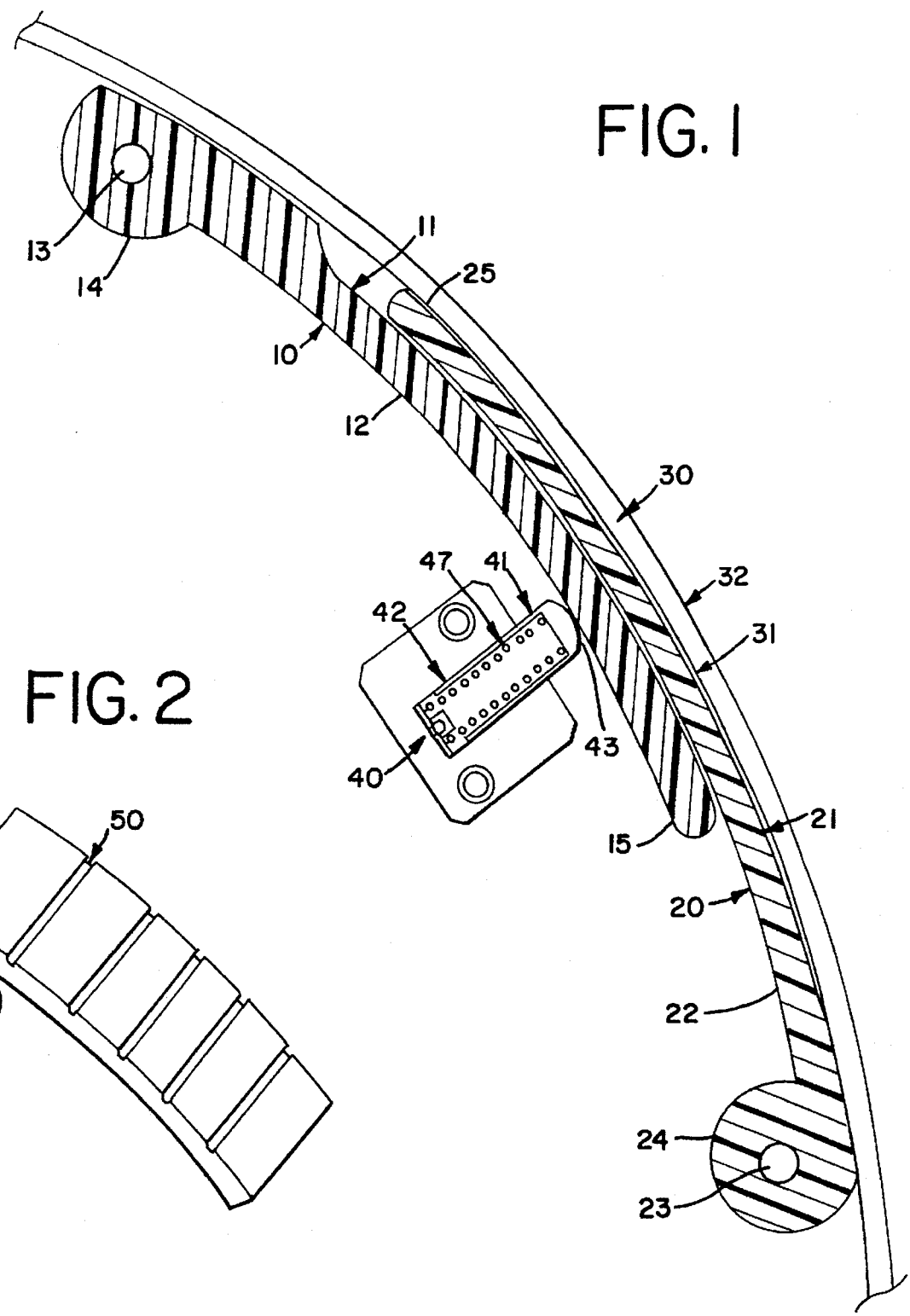

HYDRAULIC TENSIONING SYSTEM WITH DUAL ARM BLADE

Reference is made to U.S. Pat. No. 5,462,493, entitled Dual Blade Chain Tensioner With Damping, the subject matter of which relates to the present invention, and which is incorporated herein by reference.

BACKGROUND OF THE INVENTION

This invention relates to tensioners used with chain drives in automotive timing applications and more particularly to a blade-type chain tensioner system where two arms overlap each other and are supported on their free end by a hydraulic chain tensioner.

Tensioning devices are used as a control device for a power transmission chain as the chain travels between a plurality of sprockets. Generally, it is important to impart and maintain a certain degree of tension to the chain to prevent noises or slippage. Prevention of slippage is especially important in the case of a chain driven camshaft in an internal combustion engine because slippage may alter the camshaft timing by several degrees, possibly causing damage. In the harsh environment in which an internal combustion engine operates, chain tension can vary between excessively high or low levels as a result of the wide variations in temperature and differences between the coefficients of linear expansion among the various parts of the engine, including the chain and the tensioner. Camshaft and crankshaft induced torsional vibrations cause chain tension to vary considerably. This tension variation results in chain elongation. Moreover, wear of the chain components during prolonged use can cause elongation of the chain that results in a decrease in the tension of the chain.

Generally, blade-type chain tensioners use a blade spring interlocked under tension with a single shoe to provide tension to a chain. The blade spring is arcuate in shape and the shoe is relatively flat. The shoe is constructed from a semi-rigid material which will deform or "creep" upon experiencing a load at a high temperature. The blade spring is flattened to correspond to the shape of the shoe and then interlocked with it. Because the semi-rigid shoe prevents the blade spring from returning to its original more arcuate shape, the blade spring applies a load to the shoe. During operation as the heat from the engine causes the temperature of the shoe to increase and become less rigid, the load from the blade spring causes the shoe to deform to a more arcuate shape. Through such deformation, tension is provided to a chain. The chain tensioner assembly is positioned along a free length of the chain between the sprockets. As the blade spring forces the shoe into a more arcuate shape, the apex of the shoe extends farther into the span of chain thereby increasing chain tension.

Typical blade-type chain tensioners have interlocked a blade spring to only a single shoe. For example, U.S. Pat. No. 3,490,302, to Turner et al., discloses a chain tensioner where the blade spring is mounted to mechanically interlock with, and thereby provide a load to, a shoe through a hole and pin combination. The blade spring continuously bears against the shoe.

Another structure for mounting a blade spring to a single shoe is disclosed in U.S. Pat. No. 4,921,472, to Young et al. This reference discloses a blade-type tensioner having a blade spring mechanically interlocked with a shoe through a passageway in the end of the shoe without the use of a pin.

Yet another structure for mounting a blade spring to a single shoe is disclosed in U.S. Pat. No. 5,055,088, to Cradduck et al. This reference discloses a blade-type tensioner which utilizes a plurality of blade springs interlocked with a single plastic shoe through a passageway in the shoe and fastened using a pin.

An improved construction for mounting a blade spring to a shoe is disclosed in U.S. Pat. No. 5,266,066, to White. This reference discloses a blade-type chain tensioner in which a blade spring is constructed from a simple rectangular metal band formed into an arcuate shape and interlocked within a pocket in a shoe to provide a load to the shoe.

Unfortunately, while generally successful in providing tension to a chain, the prior art blade-type chain tensioners have certain limitations. For one, the range of the arcuate shape of the shoe is limited. With timing chains that have longer sprocket to sprocket center distances, as the chain temporarily lengthens due to varying operating temperature and tension variation, the chain achieves greater vertical movement compared to a chain having a shorter center distance. Also, the chain may permanently lengthen due to wear and permit increased vertical movement of the chain between the sprocket centers. To limit this vertical movement and take up this additional slack, the chain tensioner would have to bend to a more arcuate shape. However, the prior art chain tensioners may not be able to bend enough to meet the chain with adequate force to maintain the proper tension on the chain because the prior art tensioners resist great changes in shape. Usually, a much stronger blade spring is required to place a higher initial preload on the shoe to force it to the more arcuate shape necessary to take up the additional slack in the chain when it has aged and lengthened. Unfortunately, the stronger blade spring may cause the chain tensioner to impart too high a tension on a new chain during initial operation.

Another limitation of the prior art blade-type chain tensioners is that they are prone to prolonging oscillation of the chain. As discussed above, the harsh operating conditions and torsional vibrations of the engine induce varying tension in the chain. The blade spring reacts to the varying tension in the chain imparted by the torsional vibrations. Depending on the vibrational frequency, the spring force of the blade spring may react with a resonant vibration that establishes a prolonged oscillation of the chain. It is desirable to minimize this oscillation and maintain a constant tension on the chain.

U.S. Pat. No. 5,462,493 addressed these limited arcuate range and oscillation problems by providing two chain tensioner shoes in an overlapping configuration. One shoe imparts tension to the chain, while the other shoe damps the movement of the first shoe to reduce the oscillations. The overlapping shoe configuration also allows a greater range of arcuate movement so that the chain tensioner is able to meet the greater transverse movement associated with a longer center length timing chain. This invention attempts to achieve greater arcuate movement with a lower initial blade spring tension. However, such a tensioning system also is limited in the amount of tension that can be maintained on the chain as the chain lengthens due to wear.

The present invention provides for the two chain tensioner arms in an overlapping configuration, as referred to in U.S. Pat. No. 5,462,493, but also adds a hydraulic tensioner against the arms in order to provide a system with greater range of tensioning.

SUMMARY OF THE INVENTION

The present invention relates to a chain tensioner system having dual arms and a hydraulic tensioner. A tensioner is required on an automotive timing drive (chain or belt) to take up the slack as the chain wears and to take up chain stretch as the engine speed increases. The tensioner must be able to hold the force of the chain against the guide arm as the chain tension increases due to the cam and crank torsional oscillations.

The present invention utilizes a hydraulic tensioner to apply force against the free ends of the dual arms. In the system of the present invention, each arm is supported in two places, i.e., at the pivot point and against the tensioner piston. In some applications extra ribbing and wings are added to increase the strength of the arm. A face material is then added to the surface of the arm for the chain to slide on. This face is a plastic material that has a high P/V (Pressure/ Velocity) rating and can withstand the high temperatures of an operating engine. Plastic materials having a high P/V can allow a high load from the chain at a high surface speed. The best materials for achieving a high P/V rating are Vespel, Peek and Stanyl TE 373 (nylon 4/6).

The dual arm tensioner system of the present invention reduces the unsupported length of the arm to half of a traditional system. This reduces the arm inertia as well as its complexity. The arms now become simple flat plastic shoes with a hole at one end for the pivot point. Because these arms do not need to have the structural support of a traditional system, the plastic used can be of a variety that would ordinarily be used as the face material (high P/V plastic). This eliminates the need to have a separate piece added as a face and thus allows a single piece, integrally formed arm. To increase the rigidity of the tensioner arms a blade spring can be inserted into one or both of the plastic shoes. This would also help the plastic shoe maintain its shape.

In modern overhead cam engines the timing drive can go through resonances. These resonances can produce large variations in the loading of the chain. These loads then produce larger than normal motion in the tensioner piston of a conventional system. As the tensioner piston of the present invention moves in and out, the arms in the dual arm tensioner system slide against one another. As one of the tensioner arms applies the force to the chain the other arm damps the movement of the first arm. With oil between the two arms and the force from the chain, a viscous drag force is created.

In an alternative embodiment, small grooves are placed in the surfaces of the mutually contacting arms. The grooves act to create an oil shear surface that increases the damping rate. The spacing of the grooves on one arm should be smaller in length than the spacing in the other arm, so that a groove on one arm is always sliding over a groove on the other arm. This damping of the motion of the chain can help reduce the large resonance oscillations in the timing drive.

One embodiment of this tensioner arm applies tension to the chain on one bank of a single or dual overhead cam engine. Another embodiment has the tensioner arm applying tension in the center ("V") of a V6 or V8 overhead cam engine. Tensioning the chain in the "V" has several advantages. The crank to cam timing error that occurs from a worn or stretched chain is split between both banks of the engine. In addition, the timing drive system complexity is reduced from a system that could have as many as four tensioners to a system that has one tensioner.

BRIEF DESCRIPTION OF THE DRAWINGS

FIG. 1 is a side view of the tensioning system of the present invention illustrating the dual arm with single tensioner.

FIG. 2 is a schematic of a portion of the arm of FIG. 1 illustrating the grooves in the guide face.

DETAILED DESCRIPTION OF THE PREFERRED EMBODIMENTS

Figure 3:
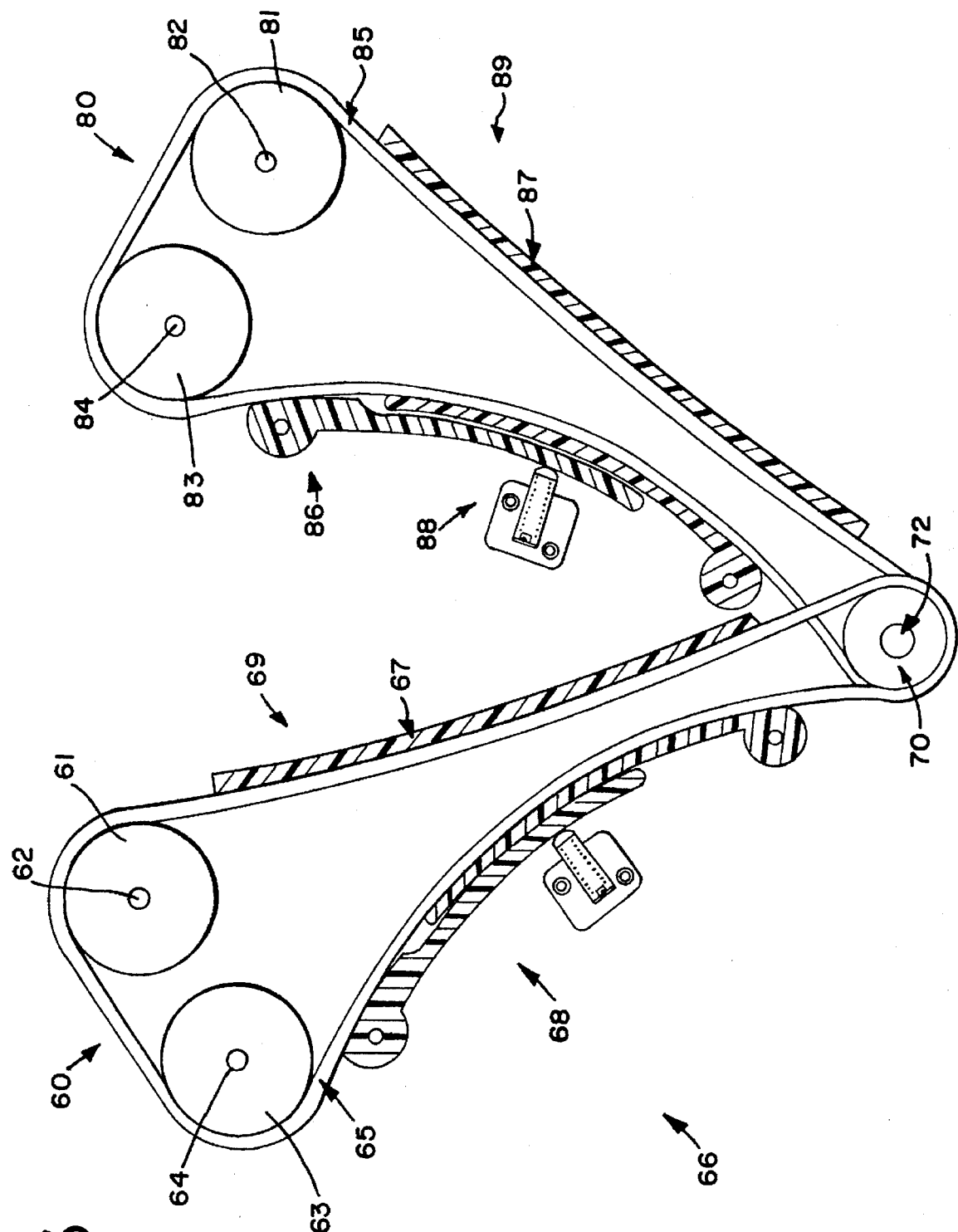
FIG. 3 is a side view of one embodiment of the tensioning system of the present invention in an engine with dual overhead camshafts.

Turning now to the drawings, FIG. 1 depicts a preferred embodiment of the system of the present invention having a single hydraulic tensioner with a dual arm blade. FIG. 1 shows an embodiment of the present invention installed adjacent to a chain 30, which is shown schematically. The tensioning system of the present invention includes two arms 12 and 22 and a hydraulic tensioner 40. Each end 14 and 24 of the arms is pivotally attached to two supports 13 and 23, respectfully, and the free ends of the arms 15 and 25 are supported by the hydraulic tensioner 40. The upper arm 22 overlaps the lower arm 12.

The upper arm 22 is positioned so that its upper side 21 is against the underside 31 of the chain 30. The bottom side 20 of the upper arm 22 is positioned against the upper side 11 of the bottom arm 12. One end of the upper arm 22 has a single pivot point 23, while the other end 25 is free.

The lower arm 12 is positioned so that its upper side 11 is against the bottom side 20 of the upper arm 22 and its bottom side 10 is against the tensioner piston 41. The lower arm has one pivot point 13 on the attached end 14 while the free end 15 rests against the tensioner piston 41.

The hydraulic tensioner 40 includes a piston 41, which is located near the free end 15 of the lower arm 12, extends upward to apply pressure on the free ends 15 and 25 of the two arms 12 and 22, respectfully. A tensioner 40, as shown in Hunter U.S. Pat. No. 5,346,436, incorporated herein by reference, typically includes, at area 42, a housing having a bore that forms a fluid chamber. The fluid chamber is supplied by fluid through a passageway from a pressure fluid source (not shown). The fluid source may be an oil pump or a reservoir. The chamber 42 receives a piston 41. A spring 47 contacts the inside of the piston 41 causing the piston to move in a protruding or outward direction. The upper end 43 of the piston 41 contacts the bottom side 10 of the lower arm 12 on its free end 15 to provide tension on both arms 12 and 22 which in turn applies tension along the chain 30.

The pivot points 14 and 24 of the two arms 12 and 22, respectfully, are the rotation points for the arms. The arms 12 and 22 are pinned, or otherwise secured, against the engine at these points 13 and 23.

Figure 4:
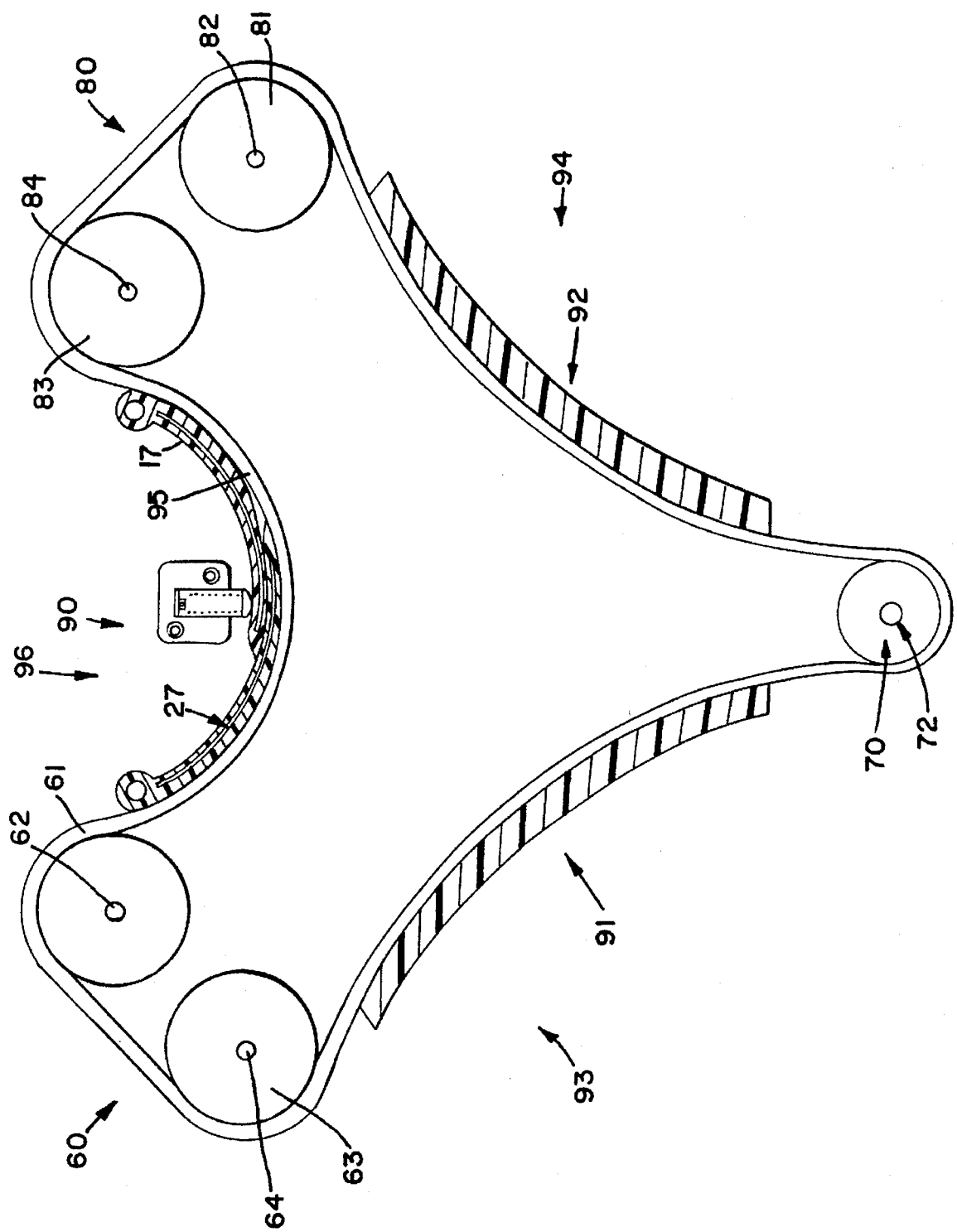
FIG. 4 is a side view of another embodiment of the tensioning system of the present invention in an engine with dual overhead camshafts.

A blade, shown more clearly in FIG. 4, can be inserted in one or both of the arms 12 and 22. This would both increase the rigidity of the tensioner arms 12 and 22 and would also help the plastic arms 12 and 22 maintain their shape.

The guide faces 10 and 20 of one or both arms 12 and 22, respectfully, may have grooves placed in them, as shown more clearly in FIG. 2. The grooves 50 are placed in a transverse direction and extend completely across the face of the arm 10 and 20. The grooves 50 allow oil to pass across the surfaces 10 and 20 of the arms to create an oil shear which will increase the damping rate.

FIG. 3 depicts one embodiment of the system of the present invention having a single hydraulic tensioner with dual arm blades in an engine with dual overhead camshafts. The engine system has two separate engine banks, the left hand engine bank 60 and the right hand engine bank 80. Each engine bank is constructed and operates in a similar manner. Each engine bank 60 and 80 includes two sprockets 61,63,81,83, respectfully, mounted on a camshaft 62,64,82, 84, respectfully. However, there is only a single crankshaft 72 and corresponding sprocket system 70 for the entire engine system.

Each engine bank 60 and 80 includes its own chain 65 and 85, chain guide 67 and 87, and its own dual arm system 68 and 88, respectfully. The chains 65 and 85 of each engine bank 60 and 80, respectfully, rotate in the same direction. The chains 65 and 85 extend from the crankshaft 72 to the first camshaft 64 and 84 to the second camshaft 62 and 82 and return to the crankshaft 72 to repeat the pattern. The movement of the crankshaft 72 and the camshafts 64,62,84, and 82 cause the sprockets 63,61,83, and 81, respectfully, to rotate. The movement of the sprockets 63,61,83 and 81 forces the chains 65 and 85 into motion. Each chain 65 and 85 has a slack side 66 and 86 and a tight side 69 and 89, respectfully. Each tight side 69 and 89 has a chain guide 67 and 87, respectfully, to keep the chain in position. Each slack side 66 and 86 has a single hydraulic tensioner with dual arm blade system 68 and 88, respectfully.

The hydraulic tensioner with dual arm blade systems of the present invention 68 and 88, located on the slack sides 66 and 86 of the two engine banks 60 and 80, respectfully, operate in the manner described in the preferred embodiment of FIG. 1. The hydraulic tensioner with dual arm blade system of the present invention 68 on the left-hand engine bank 60 operates with the tensioner 40 and the piston 41 facing in an upright direction. Whereas, the hydraulic tensioner with dual arm blade system 88 on the right-hand engine bank 80 operates with the tensioner 40 and the piston 41 facing in an inverted or downward direction.

FIG. 4 depicts another embodiment of the system of the present invention having a single hydraulic tensioner with dual arm blades in an engine with dual overhead camshafts. This embodiment has the tensioner system of the present invention applying tension in the center ("V") of a V6 or V8 overhead cam engine. The engine system has two engine banks, the left hand engine bank 60 and the right hand engine bank 80. Each engine bank is constructed in the same manner. Each engine bank 60 and 80 consists of two sprockets 61,63,81, and 83, respectfully, and within each sprocket is located a camshaft 62,64,82, and 84, respectfully. However, there is only a single crankshaft 72 and corresponding sprocket system 70 for the entire engine system.

The engine system of the present embodiment operates with the movement of a single chain 95. This single chain drives all four camshafts 62,64,82, and 84. The chain extends from the crankshaft 72 to first camshaft 64 to the second camshaft 62, of the left engine bank 60, to the third camshaft 84 to the forth camshaft 82, of the right engine bank 80, and returns to the crankshaft 72 in an endless loop. The movement of the crankshaft 72 and the camshafts 62,64,82, and 84 causes the sprockets 63,61,83, and 81, respectfully, to rotate. The movement of the sprockets 63,61, 83, and 81 forces the chain 95 into motion. Therefore, the chain has two tight sides 93 and 94 and a slack side 96. Each tight side 93 and 94 has a chain guide 91 and 92, respectfully, to keep the chain in position. The slack side 96, located at the top between the two engine banks 60 and 80, has a single hydraulic tensioner with dual arm blade system 90 in position to keep the chain taught and in position.

The hydraulic tensioner with dual arm blade system of the present invention 90, located at the top between the two engine banks 60 and 80, operates in the manner described in the preferred embodiment of FIG. 1. The hydraulic tensioner with dual arm blade system of the present invention 90 operates with the tensioner 40 and the piston 41 facing in an inverted direction. This embodiment of the dual arm blade system has a blade 17 and 27 inserted in both of the arms 12 and 22. The insertion of these blades 17 and 27 both increases the rigidity of the tensioner arms 12 and 22 and helps the plastic arms 12 and 22 maintain their shape.

Figure 5:
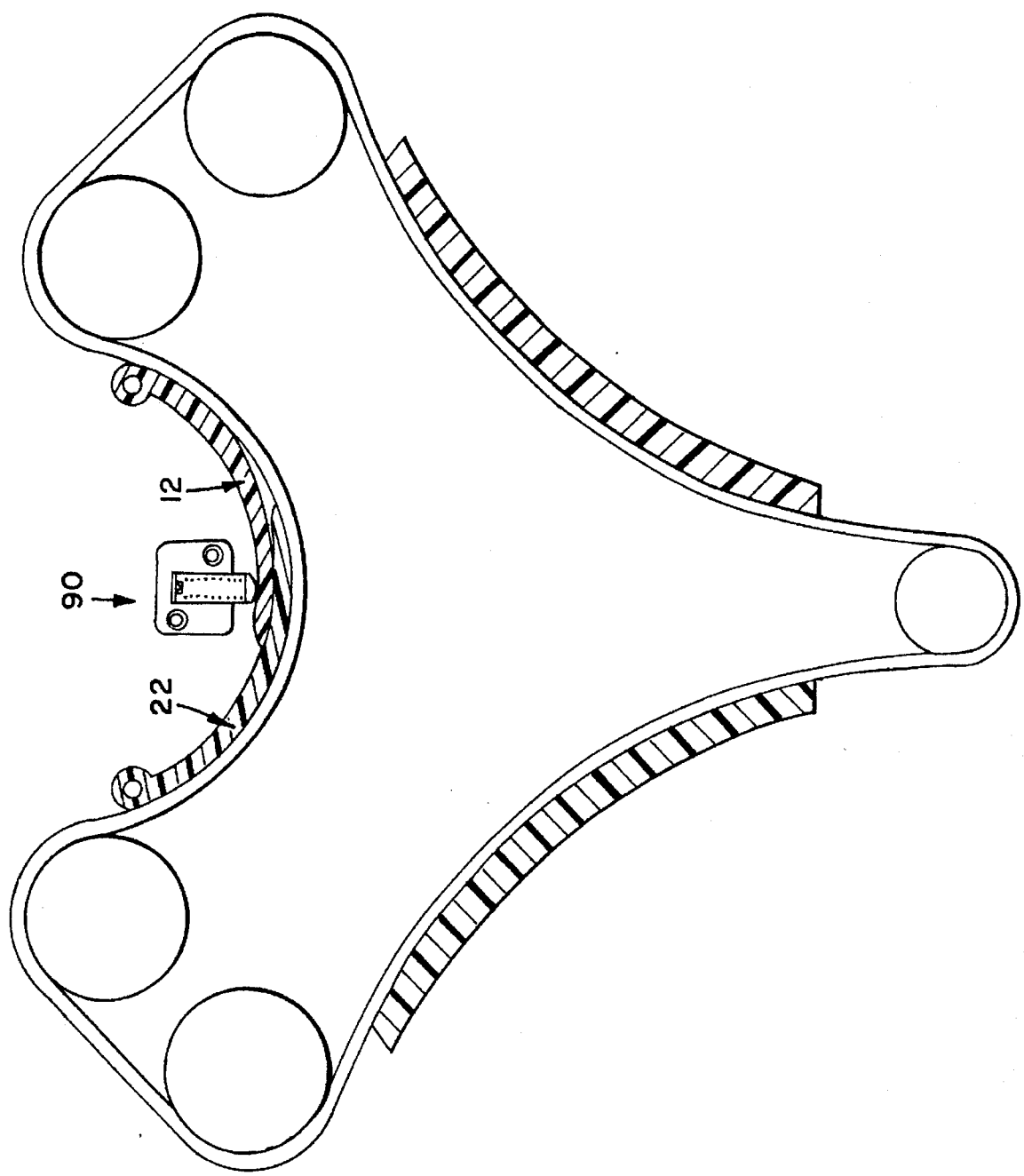
FIG. 5 is a side view of another embodiment of the tensioning system of the present invention in an engine with dual overhead camshafts.

FIG. 5 depicts another embodiment of the system of the present invention having a single hydraulic tensioner with dual arm blades in an engine with dual overhead camshafts. This embodiment operates in a similar manner to the embodiment of FIG. 4. However, there is one difference between the embodiment shown in FIG. 4 and the embodiment shown in FIG. 5. The embodiment shown in FIG. 5 does not have blades inserted within both of the arms 12 and 22 of the tensioning system 90 to provide added rigidity to the tensioner arms 12 and 22.

Figure 6:
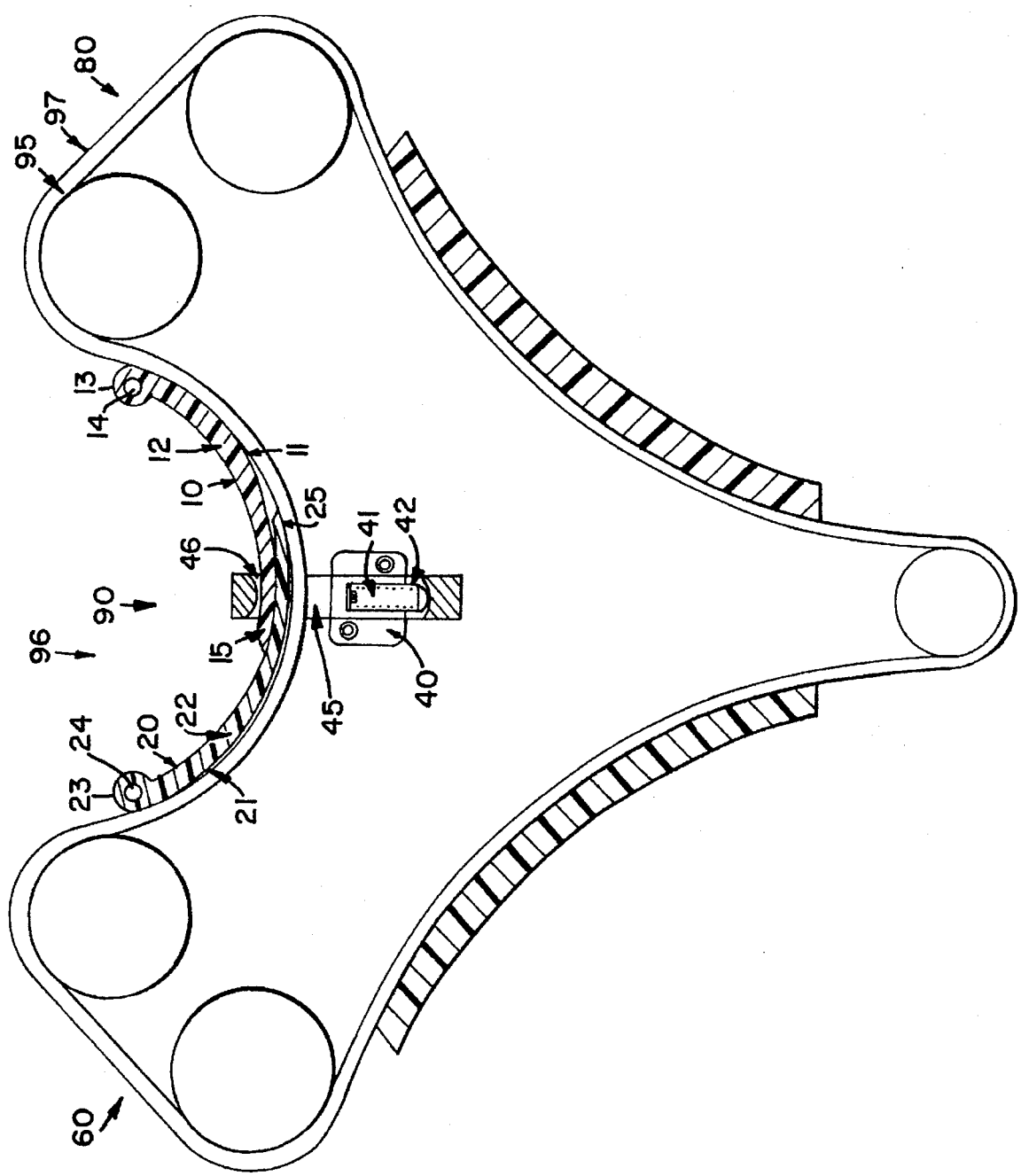
FIG. 6 is a side view of yet another embodiment of the tensioning system of the present invention in an engine with dual overhead camshafts.

FIG. 6 depicts yet another embodiment of the system of the present invention having a single hydraulic tensioner with dual arm blades in an engine with dual overhead camshafts. The engine system of the present embodiment operates in a similar manner to the engine system described in FIG. 4. This embodiment, like the embodiment shown in FIG. 4, also has the hydraulic tensioner with dual arm blade system of the present invention 90 located on the slack side 96 between the two engine banks 60 and 80 to keep the chain taught and in position. However, the tensioner system 90 is constructed in the opposite direction of the tensioner systems 90 depicted in the previous embodiments.

The hydraulic tensioner with dual arm blade system of the present invention is installed adjacent to a chain 95. The tensioning system of the present invention includes two arms 12 and 22 and a hydraulic tensioner 40. Each end 14 and 24 of the arms is pivotally attached to two supports 13 and 23, respectfully, and the free ends of the arms 15 and 25 are supported by the hydraulic tensioner 40. The upper arm 22 overlaps the lower arm 12.

The upper arm 22 is positioned so that its upper side 21 is against the upperside 97 of the chain 95. The bottom side 20 of the upper arm 22 is positioned against the upper side 11 of the bottom arm 12. One end of the upper arm 22 has a single pivot point 23, while the opposite end 25 is free.

The lower arm 12 is positioned so that its upper side 11 is against the bottom side 20 of the upper arm 22 and its bottom side 10 is against the tensioner piston 41. The lower arm has one pivot point 13, while the free end 15 rests against the hook like device 45.

The pivot points 14 and 24 of the two arms 12 and 22, respectfully, are the rotation points for the arms. The arms 12 and 22 are pinned, or otherwise secured, against the engine at these points 13 and 23.

The hydraulic tensioner 40 includes a piston 41 and a hook like device 45. The piston 41 is facing in a downward direction. A tensioner 40, as shown in Hunter U.S. Pat. No. 5,346,436, incorporated herein by reference, typically includes, at area 42, a housing having a bore that forms a fluid chamber. The fluid chamber is supplied by fluid through a passageway from a pressure fluid source (not shown). The fluid source may be an oil pump or a reservoir. The chamber 42 receives a piston 41. A spring 47 contacts the inside of the piston 41 causing the piston to move in a protruding or outward direction. When the piston 41 moves in a protruding direction it engages the hook like device 45 causing it to be pulled in a downward direction. The upper end 46 of the hook like device 45 contacts the bottom side 10 of the lower arm 12 on its free end 15 to provide tension on both arms 12 and 22 which in turn apply tension along the chain 95.

Those skilled in the art to which the invention pertains may make modifications and other embodiments employing the principles of this invention without departing from its spirit or essential characteristics, particularly upon the foregoing teachings. The described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic chain tensioner and tensioning arm system, comprising:

a housing having a bore with a fluid chamber, a hollow piston slidably received within said bore, a spring biasing the piston in the protruding direction from said bore, a check valve to permit the flow of fluid from an external source through the valve and into the fluid chamber, said piston being biased against a tensioning arm member, said tensioning arm member having a first shoe and a second shoe, said first shoe having an upper and a lower surface, said piston being biased against said lower surface of said first shoe, said second shoe being pivotally attached to a support surface, said second shoe having an upper surface and a lower surface, said upper surface of said second shoe being positioned to impart tension to a chain, said second shoe lower surface overlapping a portion of the supporting surface of said first shoe.

2. The system of claim 1 further comprising a blade spring engaging the first shoe and imparting a tension to said first shoe.

3. The system of claim 1 wherein said upper surface of said first shoe is arcuately shaped, said lower surface of said second shoe is arcuately shaped, and the lower surface of said second shoe slidably contacts at least a portion of the upper surface of said first shoe.

4. The system of claim 3 wherein said tensioner includes a viscous fluid layer between the upper surface of said first shoe and the lower surface of said second shoe.

5. The system of claim 1 wherein the second shoe is formed of a plastic material that is capable of deformation when subjected to a load at an elevated temperature.

6. The system of claim 5 wherein the first shoe is formed of different material than the second shoe.

7. The system of claim 1 wherein said lower surface of said second shoe includes a plurality of grooves extending transversely across said lower surface.

8. The system of claim 1 wherein said tensioning arm imparts tension to a chain traveling between overhead camshafts of an engine timing system.

9. The system of claim 1 wherein said tensioning arm imparts tension to a chain traveling between an overhead camshaft and a crankshaft of an engine timing system.

* * * * *